(12) United States Patent
Okada et al.

(10) Patent No.: US 7,445,239 B2
(45) Date of Patent: Nov. 4, 2008

(54) FOLDED AIRBAG AND AIRBAG DEVICE

(75) Inventors: Norihisa Okada, Tokyo (JP); Kanichi Fukuda, Wako (JP)

(73) Assignees: Takata Corporation, Tokyo (JP); Honda Motor Co., Ltd., Tokyo (JP)

( * ) Notice: Subject to any disclaimer, the term of this patent is extended or adjusted under 35 U.S.C. 154(b) by 428 days.

(21) Appl. No.: 11/221,984

(22) Filed: Sep. 9, 2005

(65) Prior Publication Data

US 2006/0055156 A1 Mar. 16, 2006

(30) Foreign Application Priority Data

Sep. 10, 2004 (JP) ............................. 2004-264200
Aug. 25, 2005 (JP) ............................. 2005-244537

(51) Int. Cl.
*B60R 21/16* (2006.01)
(52) U.S. Cl. .................................. 280/743.1
(58) Field of Classification Search .............. 280/743.1, 280/731, 728.1
See application file for complete search history.

(56) References Cited

U.S. PATENT DOCUMENTS

| | | | | |
|---|---|---|---|---|
| 4,004,828 A | * | 1/1977 | Sogabe et al. | 280/743.1 |
| 5,215,795 A | * | 6/1993 | Matsumoto et al. | 428/36.1 |
| 5,280,952 A | * | 1/1994 | Hirabayashi et al. | 280/739 |
| 5,364,126 A | * | 11/1994 | Kuretake et al. | 280/730.1 |
| 5,547,218 A | * | 8/1996 | Kuretake et al. | 280/743.1 |
| 5,681,052 A | | 10/1997 | Ricks et al. | |
| 6,007,088 A | * | 12/1999 | Yamamoto et al. | 280/728.3 |
| 6,176,509 B1 | * | 1/2001 | Kawaguchi et al. | 280/728.1 |
| 6,203,062 B1 | * | 3/2001 | Kusaka et al. | 280/743.1 |
| 6,264,237 B1 | * | 7/2001 | Terada | 280/743.1 |
| 6,443,482 B2 | * | 9/2002 | Yamamoto et al. | 280/728.1 |
| 6,471,238 B2 | * | 10/2002 | Ishikawa et al. | 280/728.3 |
| 6,547,709 B1 | * | 4/2003 | Dennis | 493/405 |
| 6,739,622 B2 | * | 5/2004 | Halford et al. | 280/743.1 |

FOREIGN PATENT DOCUMENTS

JP 08-253084 10/1996
JP 10-044900 2/1998

* cited by examiner

*Primary Examiner*—Faye M. Fleming
(74) *Attorney, Agent, or Firm*—Foley & Lardner LLP

(57) ABSTRACT

An airbag, airbag device and method provides a folded airbag that inflates leftward or rightward first and then inflates to a fully deployed shape. An airbag is folded along vertical folding lines into a band-shaped folded body that extends vertically, and the band-shaped folded body is folded along horizontal folding lines into a folded body. When the airbag inflates, a right half portion inflates faster than a left half portion.

17 Claims, 18 Drawing Sheets

FOLDED AIRBAG AND AIRBAG DEVICE

BACKGROUND

The present invention relates generally to the field of vehicle safety systems. Specifically, the present invention relates to a driver airbag device mounted in a steering wheel of an automobile and a folded airbag included in the airbag device.

Japanese Unexamined Patent Application Publication No. 10-44900 (incorporated by reference herein) discloses a method of folding a driver airbag into a substantially rectangular parallelepiped folded body. the method includes the steps of spreading the airbag, which is circular in an unfolded state; folding a left end portion and a right end portion of the airbag inward so as to obtain a band-shaped folded body that extends in a vertical direction (which is herein defined as a vertical direction in a state in which the airbag is mounted in the steering wheel); and then folding an upper portion and a lower portion of the band-shaped folded body along horizontal folding lines (see FIG. 1 in the above-mentioned publication).

The above-mentioned publication also describes a known method of obtaining a substantially rectangular parallelepiped folded airbag as an example of the related art (see FIG. 4 in the above-mentioned publication). This method includes the steps of folding an upper portion and a lower portion of a circular airbag along horizontal folding lines so as to obtain a band-shaped folded body that extends in the horizontal direction, and then folding a left portion and a right portion of the band-shaped folded body along vertical folding lines.

The folded airbag according to Japanese Unexamined Patent Application Publication No. 10-44900 substantially evenly inflates in the horizontal direction until it reaches a fully deployed shape.

SUMMARY

According to one embodiment of the invention, an airbag is folded along vertical folding lines and horizontal folding lines that extend in a vertical direction and a horizontal direction, respectively, of a steering wheel in an inflated state. The airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines. The band-shaped folded body is obtained by a process including steps of folding a half portion of the unfolded airbag in the horizontal direction (hereafter called a first half portion) onto the other half portion (hereafter called a second half portion) along a first vertical folding line positioned in the first half portion so as to obtain a primary folded body; folding the first half portion and the second half portion in the primary folded body along a second vertical folding line positioned in the second half portion so as to obtain a secondary folded body; folding the second half portion in the secondary folded body along a third vertical folding line that substantially coincides with the first vertical folding line to obtain a tertiary folded body; and folding the second half portion in the tertiary folded body along a fourth vertical folding line that substantially coincides with the second vertical folding line and folding the first half portion in the tertiary folded body along a fifth vertical folding line that substantially coincides with the first vertical folding line.

According to another embodiment of the invention, an airbag is folded along vertical folding lines and horizontal folding lines that extend in a vertical direction and a horizontal direction, respectively, of a steering wheel in an inflated state. The airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines. the band-shaped folded body is obtained by a process including steps of folding a half portion of the unfolded airbag in the horizontal direction (hereafter called a first half portion) onto the other half portion (hereafter called a second half portion) along a first vertical folding line positioned in the first half portion so as to obtain a primary folded body; folding the first half portion and the second half portion in the primary folded body along a second vertical folding line positioned in the second half portion so as to obtain a secondary folded body; and folding the first and second half portions in the secondary folded body so as to reduce the width in the horizontal direction.

According to still another embodiment of the invention, in a folded airbag, the first and second half portions in the secondary folded body are folded in a zigzag style, a roll style, or a combination of the zigzag style and the roll style so as to reduce the width in the horizontal direction.

According to yet another embodiment of the invention, in a folded airbag, the upper portion and the lower portion of the band-shaped folded body are folded a plurality of times along the horizontal folding lines, the number of times the lower portion is folded being greater than the number of times the upper portion is folded.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

An object of the present invention is to provide a folded airbag that when deployed, inflates leftward or rightward first and then inflates to a fully deployed shape. In addition, the present invention is an airbag device that includes the above-described folded airbag.

Figure 13:
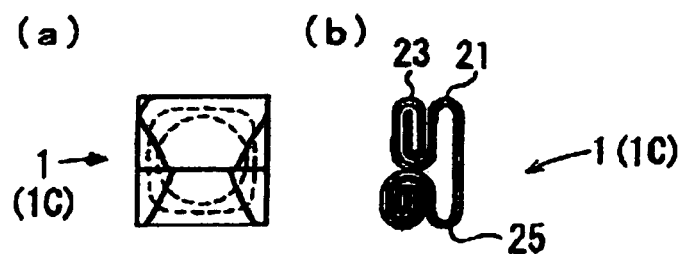
FIG. 13 is a diagram showing another step in the process of folding the airbag according to one embodiment of the present invention.
Figure 14:
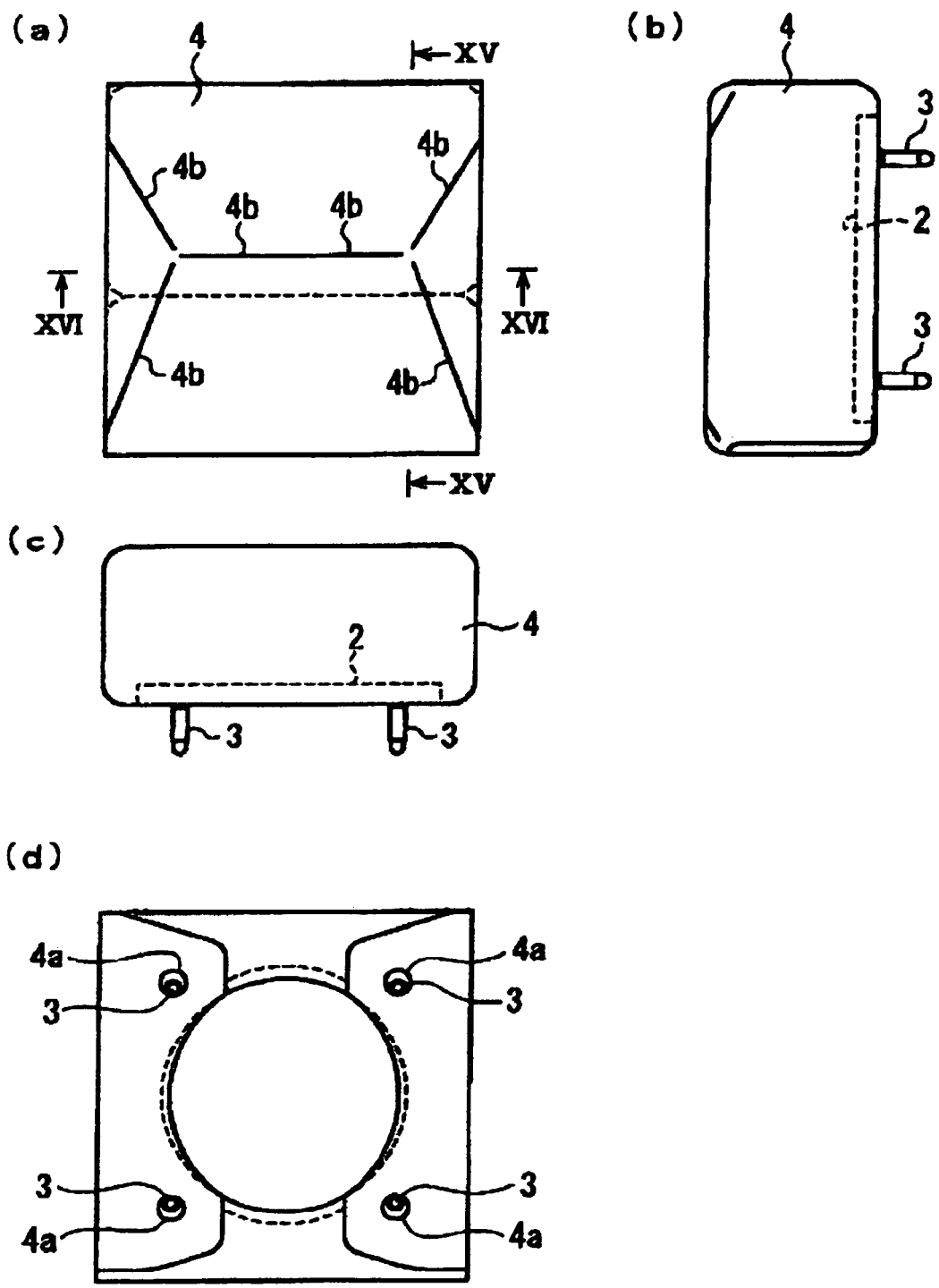
FIG. 14 is a diagram showing an assembly of the folded airbag and a protector cloth according to one embodiment of the present invention.
Figure 15:
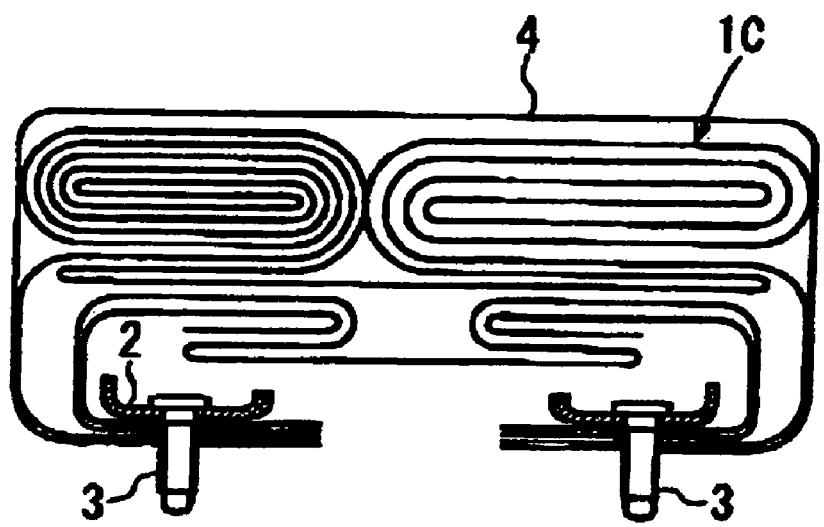
FIG. 15 is a sectional view of FIG. 14 taken along line XV-XV.
Figure 16:
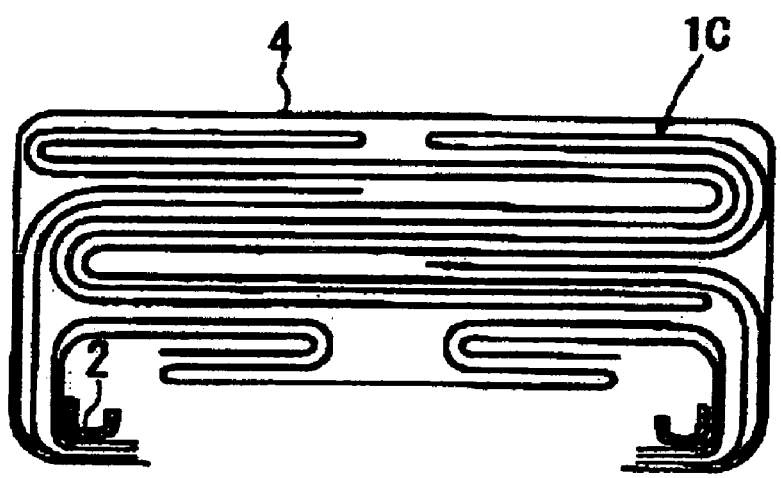
FIG. 16 is a sectional view of FIG. 14 taken along line XVI-XVI.

FIGS. 1 to 13 are diagrams showing a method of folding an airbag for forming a folded airbag according to an embodiment of the present invention. In each figure, (a) and (b) are a front view and a side view, respectively, of the airbag. FIG. 14 is a diagram showing an assembly in which a retainer is attached to the folded airbag. In FIG. 14, (a) shows a front view, (b) and (c) show side views, and (d) shows a back view. FIGS. 15 and 16 are sectional views of FIG. 14(*a*) taken along lines XV-XV and XVI-XVI, respectively.

An airbag 1 is obtained by sewing two circular panels (front and rear panels) together at the periphery. the rear panel has vent holes 1*a* and an inflator insertion opening at the center, and a retainer is inserted into the airbag 1 through the inflator insertion opening formed at the center. Although a retaining ring 2 is shown by dash lines in FIG. 1(*a*) to FIG. 13(*a*), the retaining ring 2 is preferably inserted after the airbag 1 is folded.

Figure 1:
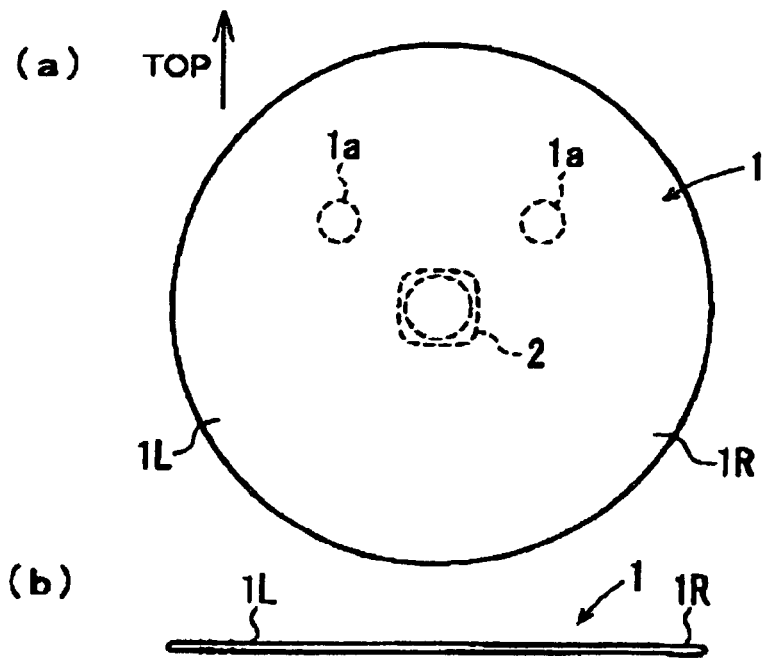
FIG. 1 is a diagram showing a step in a process of folding an airbag according to one embodiment of the present invention.

In a process of folding the airbag 1, the airbag 1 is spread over a flat workbench, as shown in FIG. 1. the arrow TOP in FIG. 1(*a*) shows the vertical direction. As described above, the vertical direction is defined as a vertical direction in a state in which the airbag device is mounted in a steering wheel. In this state, the steering wheel is, of course, in an orientation for moving the automobile straight.

Figure 2:
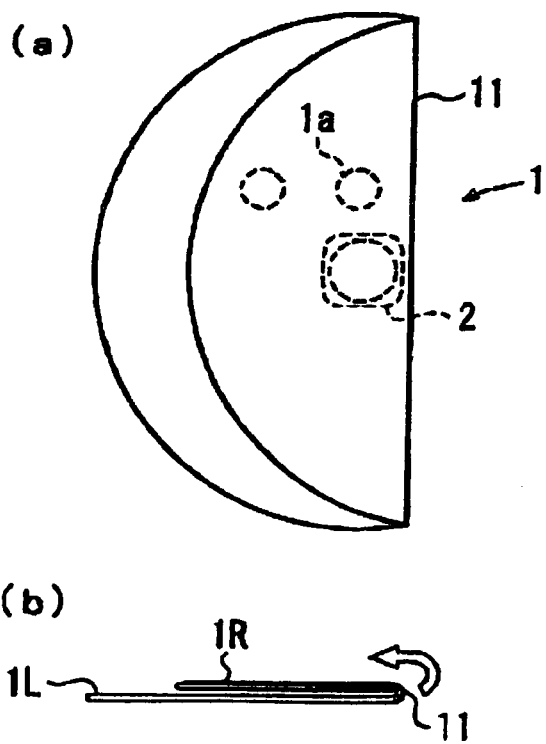
FIG. 2 is a diagram showing another step in the process of folding the airbag according to one embodiment of the present invention.

In the present embodiment, as shown in FIG. 2, a right half portion 1R of the airbag 1 is folded onto a left half portion 1L along a first vertical folding line 11 set at a position shifted rightward from the center of the airbag 1. Thus, a primary folded body is obtained.

Figure 3:
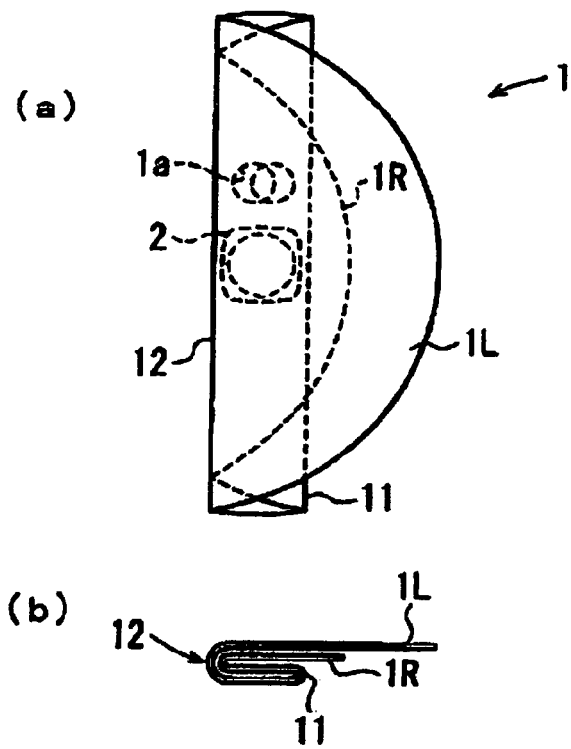
FIG. 3 is a diagram showing another step in the process of folding the airbag according to one embodiment of the present invention.

Next, as shown in FIG. 3, the right half portion 1R and the left half portion 1L are folded rightward along a second vertical folding line 12 set at a position shifted leftward from the center of the airbag. Thus, a secondary folded body is obtained.

Figure 4:
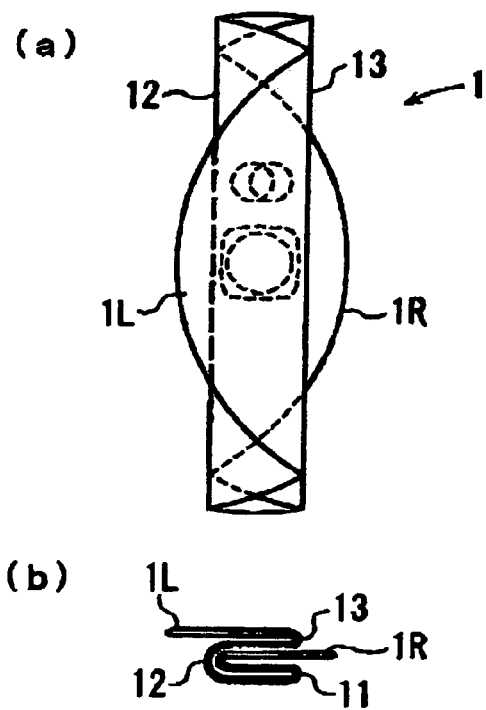
FIG. 4 is a diagram showing another step in the process of folding the airbag according to one embodiment of the present invention.

Next, as shown in FIG. 4, the left half portion 1L is folded leftward along a third vertical folding line 13 that coincides with the first vertical folding line 11. Thus, a tertiary folded body is obtained.

Figure 5:
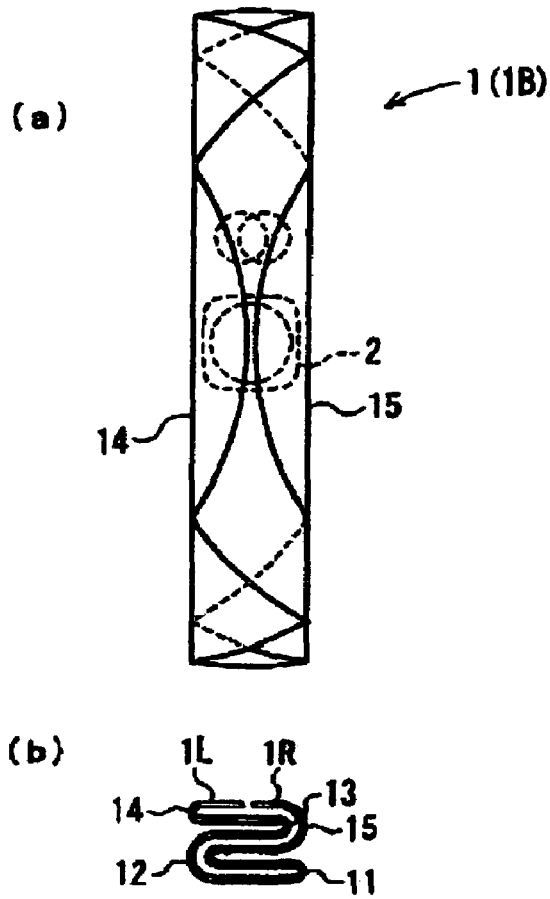
FIG. 5 is a diagram showing another step in the process of folding the airbag according to one embodiment of the present invention.

Then, as shown in FIG. 5, an end section of the left half portion 1L in the tertiary folded body is folded onto the tertiary folded body along a fourth vertical folding line 14 that coincides with the second vertical folding line 12, and an end section of the right half portion 1R in the tertiary folded body is folded onto the tertiary folded body along a fifth vertical folding line 15 that coincides with the third vertical folding line 13. Accordingly, a band-shaped folded body 1B that extends vertically is obtained. the order in which folding along the fourth vertical folding line 14 and folding along the fifth vertical folding line 15 are performed is not limited.

Figure 6:
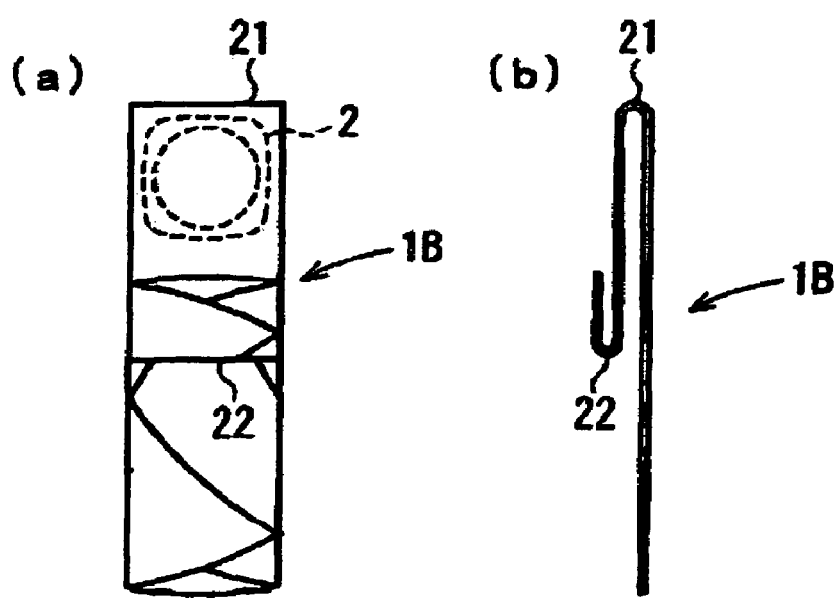
FIG. 6 is a diagram showing another step in the process of folding the airbag according to one embodiment of the present invention.
Figure 7:
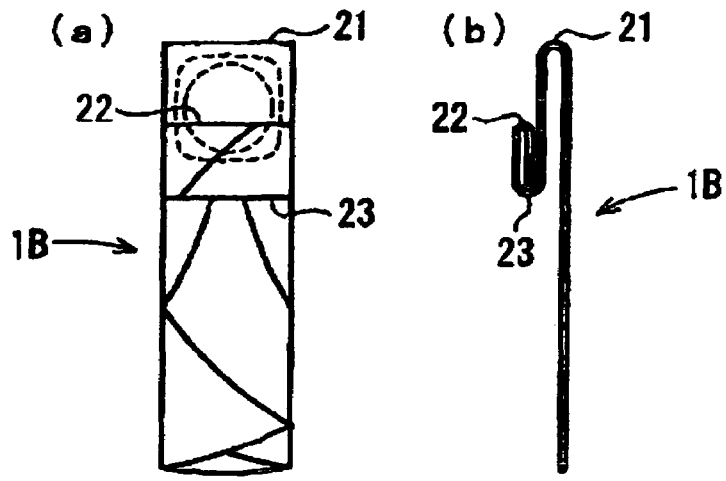
FIG. 7 is a diagram showing another step in the process of folding the airbag according to one embodiment of the present invention.
Figure 8:
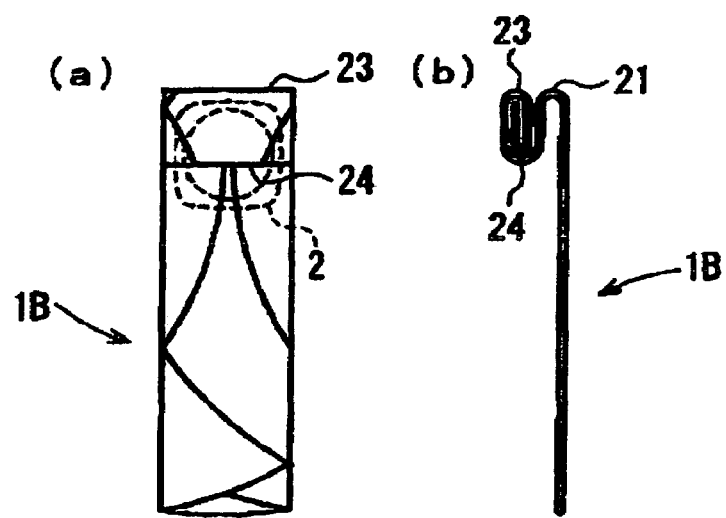
FIG. 8 is a diagram showing another step in the process of folding the airbag according to one embodiment of the present invention.

Next, as shown in FIG. 6, an upper portion of the band-shaped folded body 1B is folded along a first horizontal folding line 21 at a base end of the upper portion (an end adjacent to the retaining ring 2), and an end section at the other end of the upper portion is folded back along a second horizontal folding line 22. Then, as shown in FIGS. 7 and 8, the upper portion is successively folded along third and fourth horizontal folding lines 23 and 24. the folding style of the upper portion along the second, third, and fourth horizontal folding lines 22, 23, and 24 is a so-called roll style.

Figure 9:
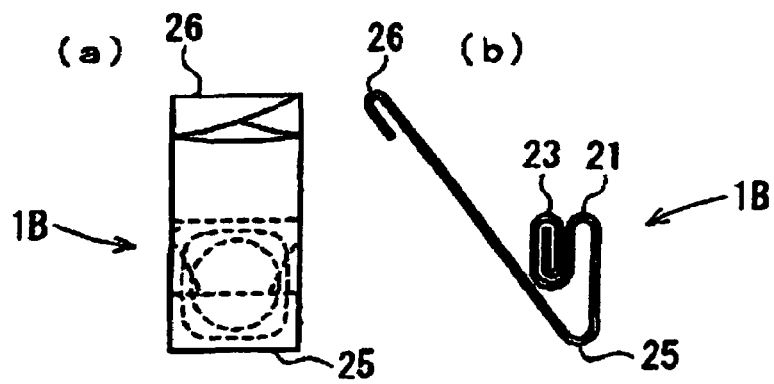
FIG. 9 is a diagram showing another step in the process of folding the airbag according to one embodiment of the present invention.
Figure 10:
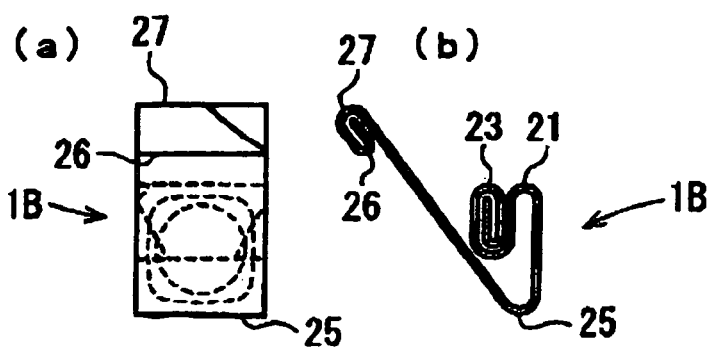
FIG. 10 is a diagram showing another step in the process of folding the airbag according to one embodiment of the present invention.
Figure 11:
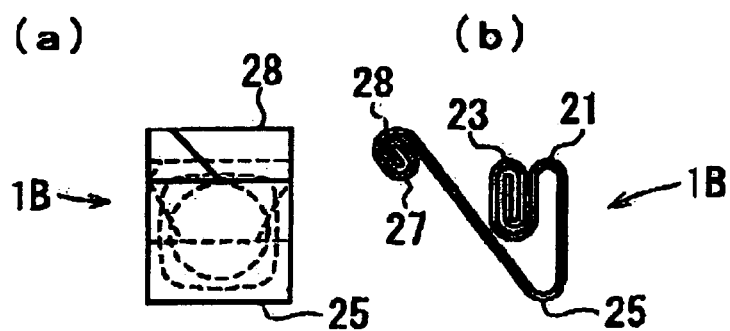
FIG. 11 is a diagram showing another step in the process of folding the airbag according to one embodiment of the present invention.
Figure 12:
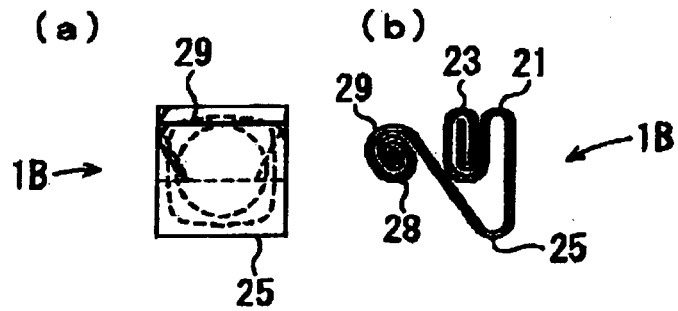
FIG. 12 is a diagram showing another step in the process of folding the airbag according to one embodiment of the present invention.

After the upper portion of the band-shaped folded body is folded in the above-described manner, a lower portion of the band-shaped folded body is folded along a horizontal folding line 25 at a base end of the lower portion as shown in FIG. 9. Then, as shown in FIGS. 9 to 13, the lower portion is successively folded along horizontal folding lines 26, 27, 28, and 29 from an end section at the other end of the lower portion in a roll style. As shown in FIG. 13, the upper and lower portions of the band-shaped folded body 1B are placed at a central region of the band-shaped folded body 1B in the longitudinal direction in the folded state. Thus, the folded airbag 1C is obtained.

The retaining ring 2 is inserted into the folded airbag 1C, and stud bolts 3 that project from the retaining ring 2 are inserted through bolt holes formed in the airbag. Then, the folded airbag 1C is covered with a protector cloth 4.

As shown in FIGS. 14 to 16, the folded airbag 1C is tightly covered with the protector cloth 4 by inserting the stud bolts 3 through bolt holes 4a formed in the protector cloth 4. the protector cloth 4 has slits 4b. When the airbag 1 is inflated, the protector cloth 4 tears along these slits 4b.

Then, a retainer and an inflator (not shown) are attached to the assembly of the folded airbag 1C, the retaining ring 2, and the protector cloth 4, and a module cover (not shown) is attached to the retainer so as to cover the assembly. Accordingly, an airbag device is completed.

As described above, the airbag device is attached to the steering wheel in an orientation such that the direction shown by the arrow TOP shown in FIG. 1 points upward.

When the front end of an automobile in which this airbag device is mounted collides, the inflator is activated to inflate the airbag. At this time, the right half portion 1R of the airbag 1, which is on the right side as viewed from the occupant, inflates faster than the left half portion 1L. Therefore, a component of inflation velocity of the inflating airbag 1 in a direction toward the occupant is smaller than that in the case in which the airbag 1 evenly inflates in the horizontal direction. As a result, the occupant which moves toward the inflating airbag 1 is relatively softly received by the airbag 1.

According to one embodiment of the present invention, as shown in FIG. 13, the number of times the lower portion is folded in the folded airbag 1C is greater than the number of times the upper portion is folded. Therefore, when the airbag 1 inflates, the upper portion of the airbag 1 inflates faster than the lower portion, so that the upper portion inflates larger than the lower portion during the inflation. As a result, the surface of the airbag 1 that faces the occupant is orientated substantially vertically during inflation, so that the occupant's upper body is evenly received by the airbag 1.

Figure 17:
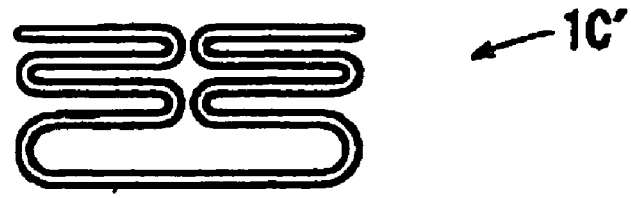
FIG. 17 is a diagram showing a folding style according to one embodiment of the present invention.
Figure 18:
FIG. 18 is a diagram showing a folding style according to one embodiment of the present invention.
Figure 19:
FIG. 19 is a diagram showing a folding style according to one embodiment of the present invention.

In the above-described embodiment, as shown in FIG. 13, the upper and lower portions of the band-shaped folded body are folded in a roll style in the folded airbag 1C. However, the present invention is not limited to this, and various folding styles may be used. FIGS. 17 to 19 are diagrams showing other examples of folding styles. In a folded body 1C' shown in FIG. 17, upper and lower portions are both folded in a zigzag style.

In a folded body 1C'' shown in FIG. 18, upper and lower portions are folded in a roll style in a direction opposite to that in FIG. 13. In a folded body 1C''' shown in FIG. 19, upper and lower portions are folded in a roll style in a positive direction first, and then in the opposite direction.

In the process of folding the airbag 1 into the band-shaped folded body, the airbag 1 may be folded in a manner reversed from that shown in FIGS. 1 to 5 in the horizontal direction. FIGS. 20 to 23 are diagrams showing a process of folding an airbag 1 in a manner reversed from that shown in FIGS. 1 to 5 in the horizontal direction. In each figure, (a) and (b) are a front view and a side view, respectively, of the airbag.

Figure 20:
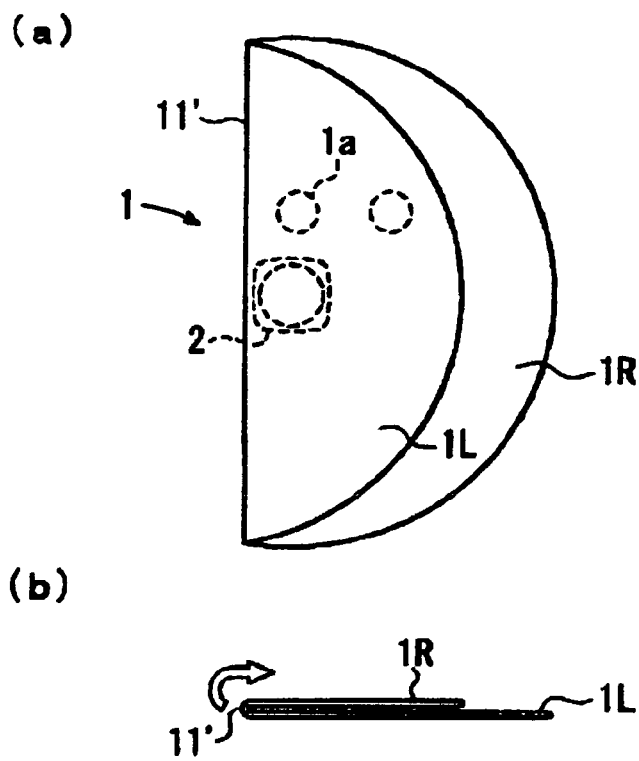
FIG. 20 is a diagram showing a step in a process of folding an airbag according to one embodiment of the present invention.

Also in this embodiment, first, an airbag 1 is spread over a flat workbench, as shown in FIG. 1. Then, as shown in FIG. 20, a left half portion 1L of the airbag 1 is folded onto a right half portion 1R along a first vertical folding line 11' set at a position shifted leftward from the center of the airbag 1. Thus, a primary folded body is obtained.

Figure 21:
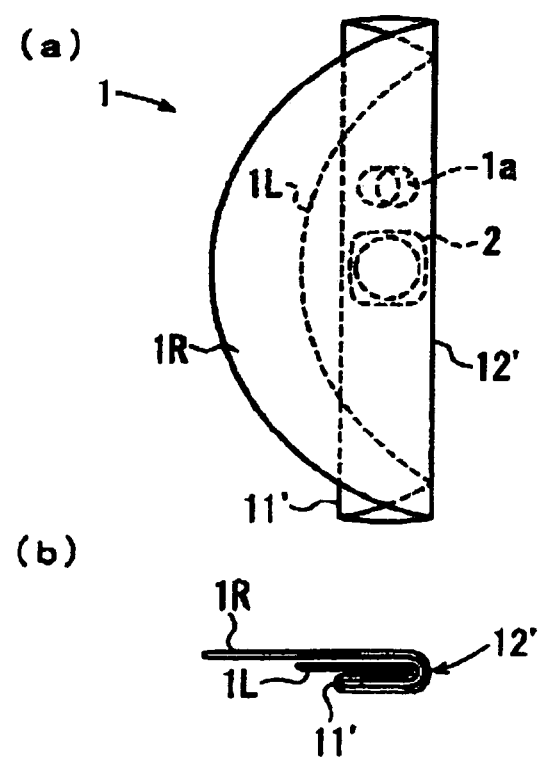
FIG. 21 is a diagram showing another step in the process of folding the airbag according to one embodiment of the present invention.

Next, as shown in FIG. 21, the left half portion 1L and the right half portion 1R are folded leftward along a second vertical folding line 12' set at a position shifted rightward from the center of the airbag. Thus, a secondary folded body is obtained.

Figure 22:
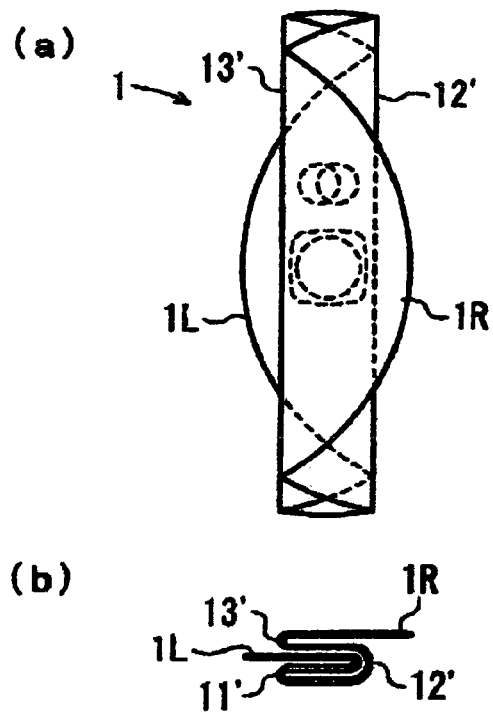
FIG. 22 is a diagram showing another step in the process of folding the airbag according to one embodiment of the present invention.

Next, as shown in FIG. 22, the right half portion 1R is folded rightward along a third vertical folding line 13' that coincides with the first vertical folding line 11'. Thus, a tertiary folded body is obtained.

Figure 23:
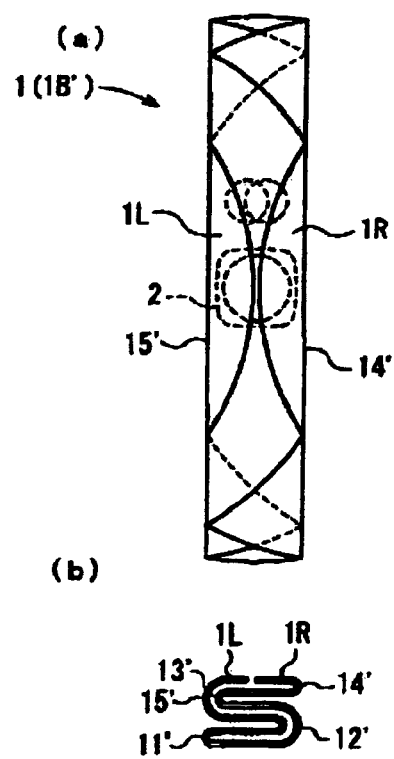
FIG. 23 is a diagram showing another step in the process of folding the airbag according to one embodiment of the present invention.

Next, as shown in FIG. 23, an end section of the right half portion 1R in the tertiary folded body is folded onto the tertiary folded body along a fourth vertical folding line 14' that coincides with the second vertical folding line 12', and an end section of the left half portion 1L in the tertiary folded body is folded onto the tertiary folded body along a fifth vertical folding line 15' that coincides with the third vertical folding line 13'. Accordingly, a band-shaped folded body 1B' that extends vertically is obtained. Also in this embodiment, the order in which folding along the fourth vertical folding line 14' and folding along the fifth vertical folding line 15' are performed is not limited.

When the airbag 1 is folded in a manner reversed from that shown in FIGS. 1 to 5, the left half portion 1L of the airbag 1, which is on the left side as viewed from the occupant, inflates faster than the right half portion 1R.

FIGS. 24 to 30 are diagrams showing a process of folding an airbag 1 according to another embodiment. In each figure, (a) and (b) are a front view and a side view, respectively, of the airbag.

The structure of an airbag 1 according to this embodiment and the structure of an airbag device including the airbag 1 are the same as those in the embodiment shown in FIGS. 1 to 16.

The process of folding the airbag 1 according to the present embodiment will be described below.

Figure 24:
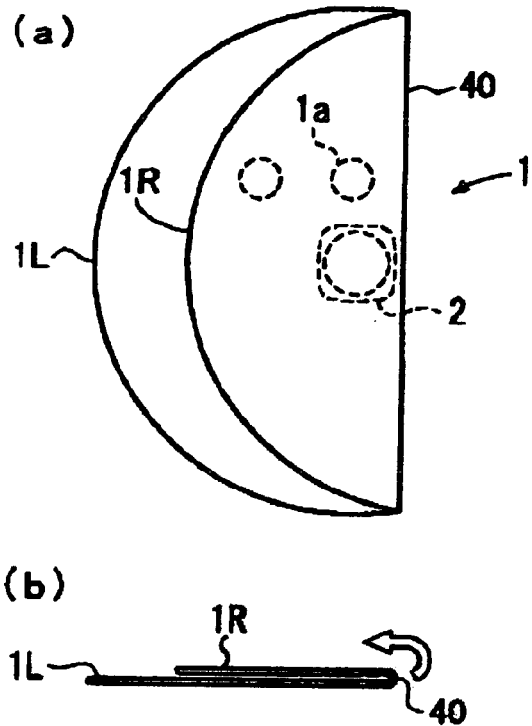
FIG. 24 is a diagram showing a step in a process of folding an airbag according to one embodiment of the present invention.
Figure 25:
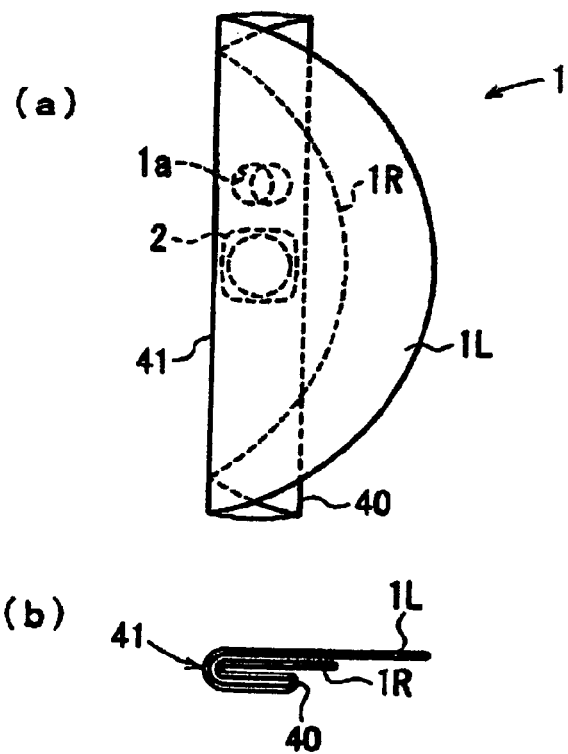
FIG. 25 is a diagram showing another step in the process of folding the airbag according to one embodiment of the present invention.

In the process of folding the airbag 1 according to the present embodiment, first, the airbag 1 is spread over a flat workbench, as shown in FIG. 1. Then, as shown in FIG. 24, a right half portion 1R of the airbag 1 is folded onto a left half portion 1L along a first folding line 40 set at a position shifted rightward from the center of the airbag 1. Thus, a primary folded body is obtained. Next, as shown in FIG. 25, the right half portion 1R and the left half portion 1L are folded rightward along a second folding line 41 set at a position shifted leftward from the center of the airbag. Thus, a secondary folded body is obtained.

The steps of folding the airbag 1 into the secondary folded body are similar to those shown in FIGS. 1 to 3.

Figure 26:
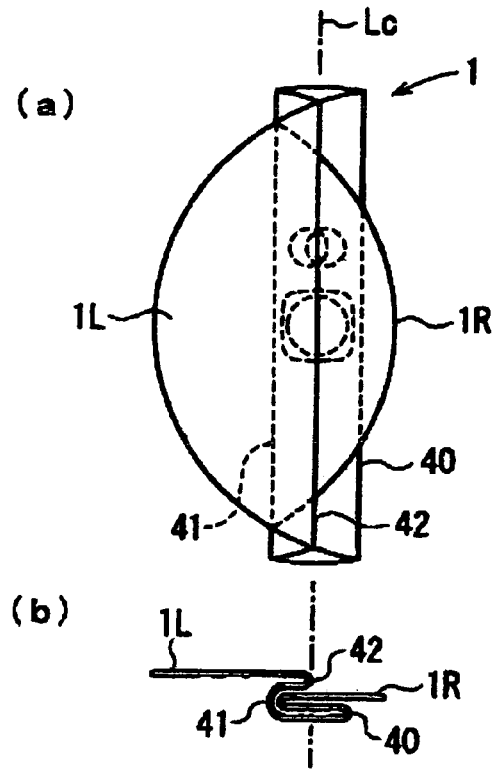
FIG. 26 is a diagram showing another step in the process of folding the airbag according to one embodiment of the present invention.
Figure 27:
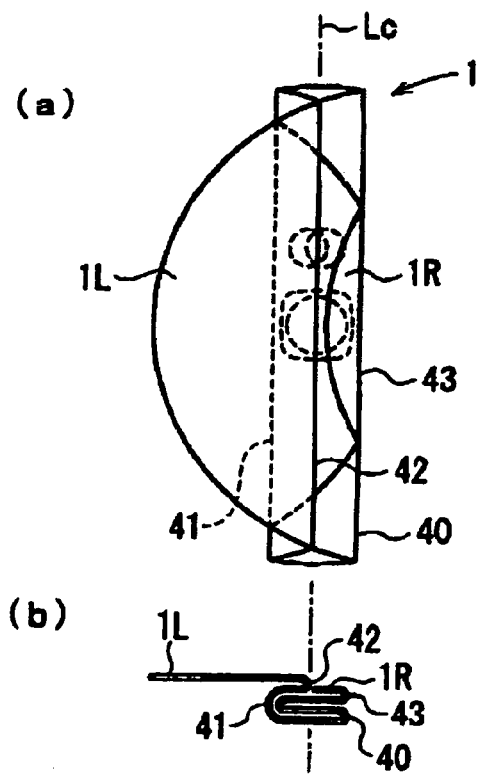
FIG. 27 is a diagram showing another step in the process of folding the airbag according to one embodiment of the present invention.

Next, as shown in FIG. 26, the left half portion 1L in the secondary folded body is folded leftward along a third folding line 42 set at a position substantially coinciding with a centerline Lc of the airbag 1 in the horizontal direction or at a position slightly shifted from the centerline Lc toward the second folding line 41. Then, as shown in FIG. 27, an end section of the right half portion 1R in the secondary folded body is folded leftward onto the secondary folded body along a fourth folding line 43 that coincides with the first folding line 40.

The step of folding the right half portion 1R along the fourth folding line 43 may also be performed after folding the left half portion 1L in a zigzag style (after the step of folding the left half portion 1L along a seventh folding line 46, which will be described below).

Figure 28:
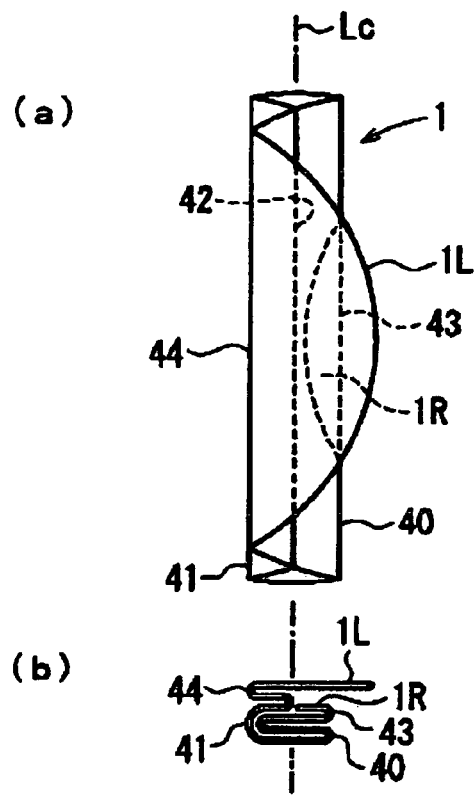
FIG. 28 is a diagram showing another step in the process of folding the airbag according to one embodiment of the present invention.
Figure 29:
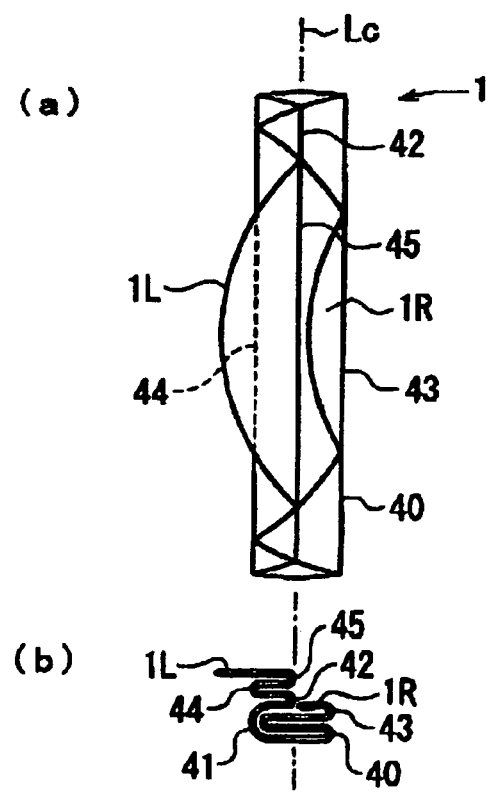
FIG. 29 is a diagram showing another step in the process of folding the airbag according to one embodiment of the present invention.
Figure 30:
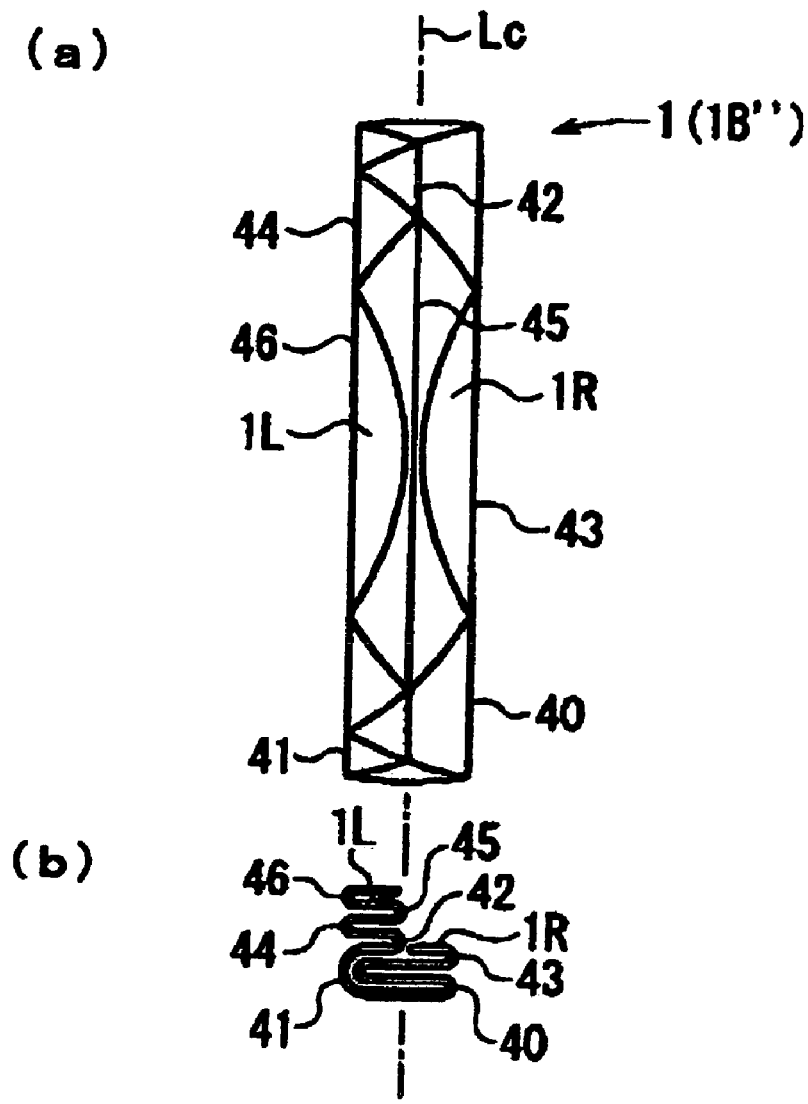
FIG. 30 is a diagram showing another step in the process of folding the airbag according to one embodiment of the present invention.

Next, the left half portion 1L is successively folded rightward along a fifth folding line 44 that coincides with the second vertical folding line 41 as shown in FIG. 28, leftward along a sixth folding line 45 that coincides with the third folding line 42 as shown in FIG. 29, and rightward along the seventh folding line 46 that coincides with the fifth folding line 44 as shown in FIG. 30. Thus, the left half portion 1L is folded in a zigzag style on the secondary folded body.

Accordingly, a band-shaped folded body 1B" having a small width in the horizontal direction that extends vertically is obtained.

Next, the band-shaped folded body 1B" is folded to reduce the vertical size thereof by either the process shown in FIGS. 6 to 13 or the process shown in FIG. 17, 18, or 19. Accordingly, the folded airbag 1 is obtained.

Then, a retaining ring 2 is inserted into the folded airbag, and stud bolts 3 that project from the retaining ring 2 are inserted through bolt holes formed in the airbag. Then, the folded airbag 1 is covered with a protector cloth 4. Then, a retainer and an inflator are attached to the assembly of the folded airbag, the retaining ring 2, and the protector cloth 4, and a module cover is attached to the retainer so as to cover the assembly. Accordingly, an airbag device is completed.

Also in this embodiment, when the front end of an automobile in which this airbag device is mounted collides, the inflator is activated and the airbag 1 is inflated with gas supplied from the inflator. At this time, the right half portion 1R of the airbag 1, which is on the right side as viewed from the occupant, inflates faster than the left half portion 1L. Therefore, a component of inflation velocity of the inflating airbag 1 in a direction toward the occupant is smaller than that in the case in which the airbag 1 evenly inflates in the horizontal direction. As a result, the occupant which moves toward the inflating airbag 1 is relatively softly received by the airbag 1.

In this embodiment, the end section of the right half portion 1R in the secondary folded body is folded onto the secondary folded body. However, the end section of the right half portion 1R may also be folded so as to be placed under a section of the right half portion 1R between the fourth folding line 43 and the second folding line 41.

In addition, in the present embodiment, the right half portion 1R in the secondary folded body is folded leftward only once along the fourth folding line 43. However, the right half portion 1R may also be alternately folded leftward and rightward a plurality of times in a zigzag style. Alternatively, the right half portion 1R may be folded in a roll style.

The airbag 1 may also be folded in a manner reversed from that shown in FIGS. 24 to 30 in the horizontal direction. In such a case, when the airbag 1 inflates, the left half portion 1L of airbag 1, which is on the left side as viewed from the occupant, inflates faster than the right half portion 1R.

FIGS. 31 to 37 are diagrams showing a process of folding an airbag 1 according to still another embodiment. In each figure, (a) and (b) are a front view and a side view, respectively, of the airbag.

Also in this embodiment, the structure of an airbag 1 and the structure of an airbag device including the airbag 1 are the same as those in the embodiment shown in FIGS. 1 to 16.

The process of folding the airbag 1 according to the present embodiment will be described below.

Figure 31:
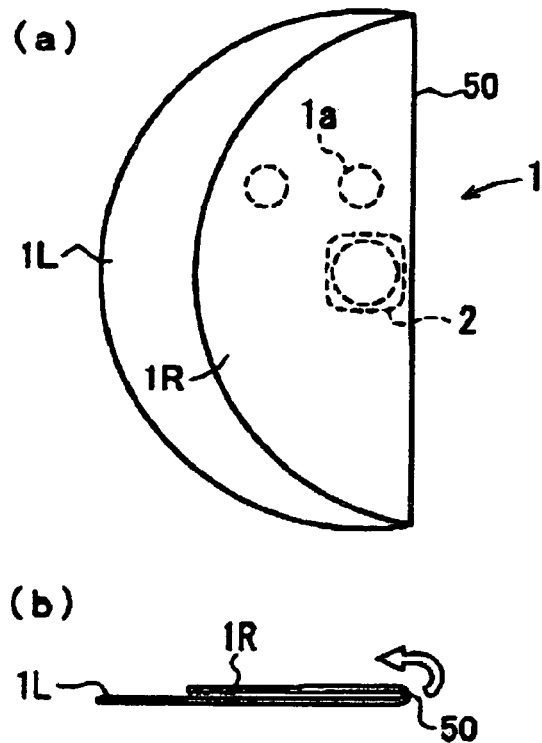
FIG. 31 is a diagram showing a step in a process of folding an airbag according to one embodiment of the present invention.
Figure 32:
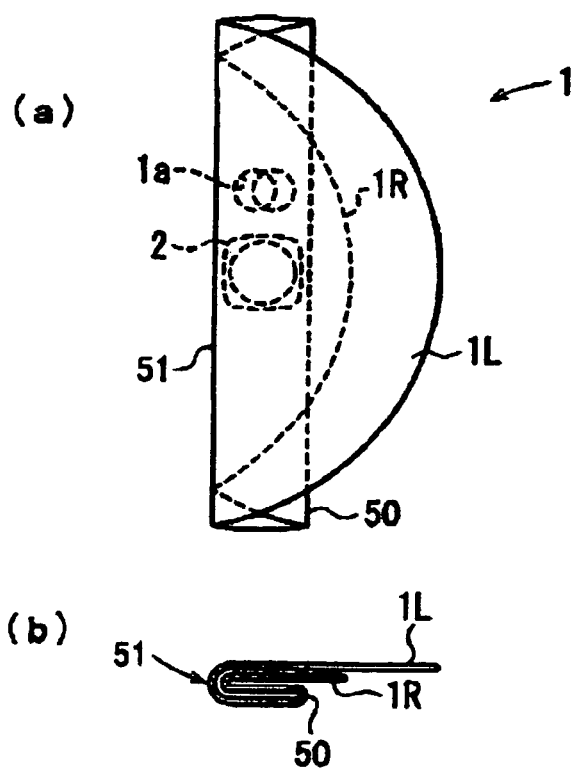
FIG. 32 is a diagram showing another step in the process of folding the airbag according to one embodiment of the present invention.
Figure 33:
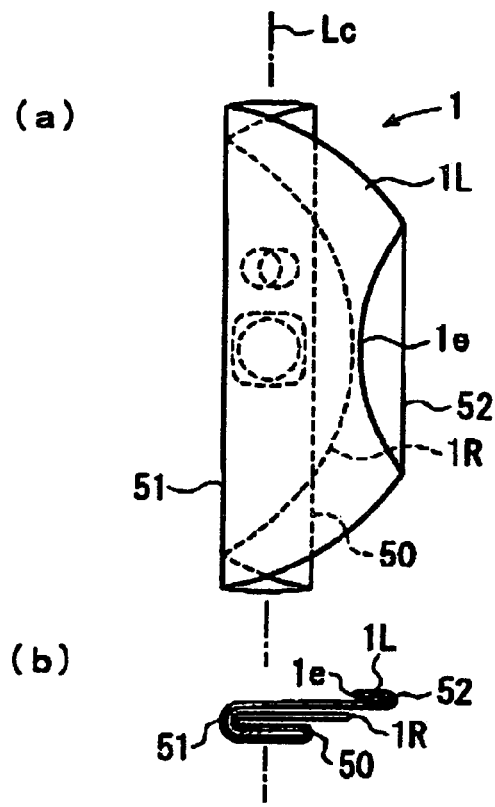
FIG. 33 is a diagram showing another step in the process of folding the airbag according to one embodiment of the present invention.
Figure 34:
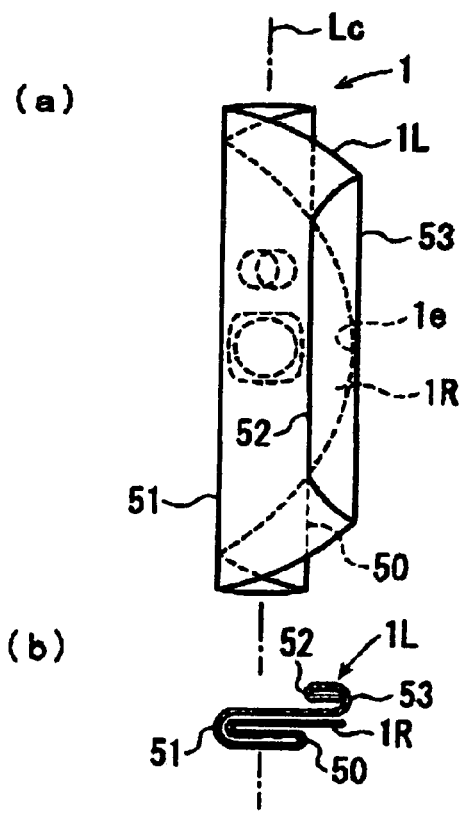
FIG. 34 is a diagram showing another step in the process of folding the airbag according to one embodiment of the present invention.
Figure 35:
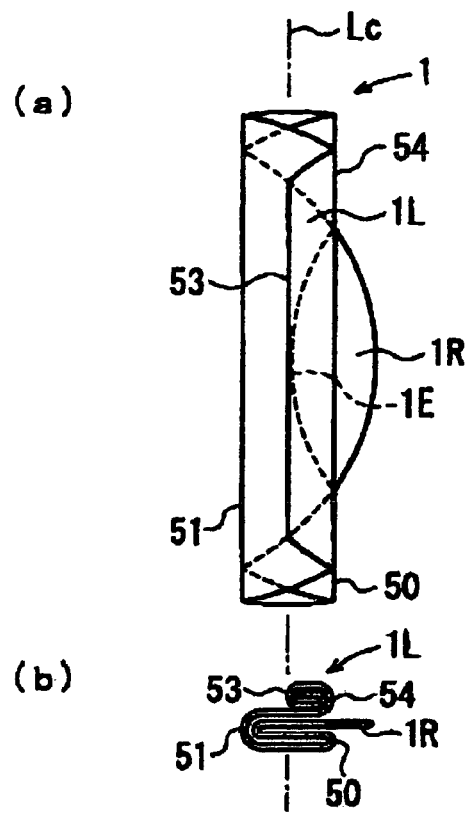
FIG. 35 is a diagram showing another step in the process of folding the airbag according to one embodiment of the present invention.
Figure 36:
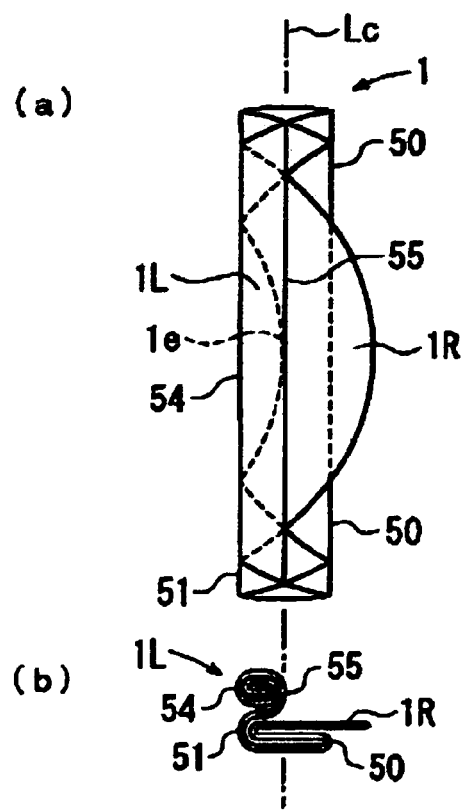
FIG. 36 is a diagram showing another step in the process of folding the airbag according to one embodiment of the present invention.

Also in the present embodiment, in the process of folding the airbag 1, first, the airbag 1 is spread over a flat workbench, as shown in FIG. 1. Then, as shown in FIG. 31, a right half portion 1R of the airbag 1 is folded onto a left half portion 1L along a first folding line 50 set at a position shifted rightward from the center of the airbag 1. Thus, a primary folded body is obtained. Next, as shown in FIG. 32, the right half portion 1R and the left half portion 1L are folded rightward along a second folding line 51 set at a position shifted leftward from the center of the airbag. Thus, a secondary folded body is obtained.

Next, as shown in FIGS. 33 to 36, the left half portion 1L in the secondary folded body is successively folded from an end section 1e along third to sixth folding lines 52, 53, 54, and 55 in a roll style on the secondary folded body.

In the present embodiment, gaps between the folding lines 52 to 55 are set such that a rolled body obtained by folding the left half portion 1L in a roll style has a horizontal width that is equal to the distance between a centerline Lc of the airbag 1 and the second folding line 51. In addition, the sixth folding line 55, which is the last folding line along which the left half portion 1L is folded in a roll style, coincides with the centerline Lc.

Figure 37:
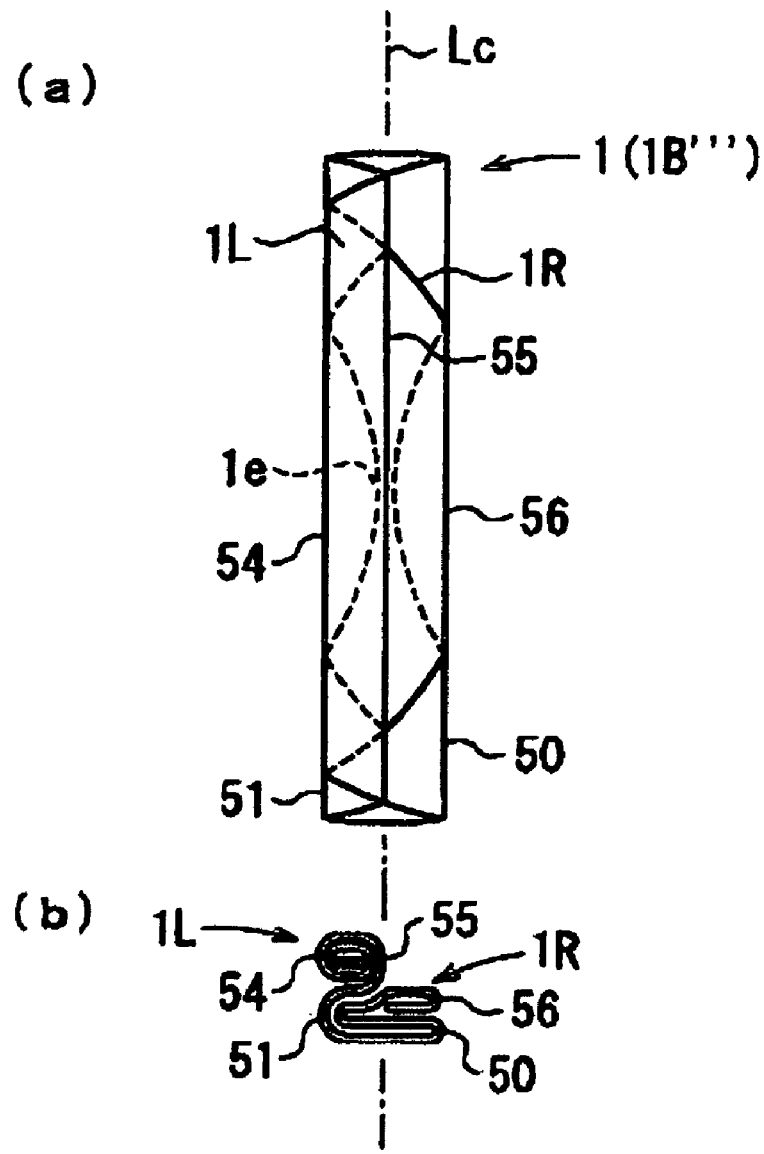
FIG. 37 is a diagram showing another step in the process of folding the airbag according to one embodiment of the present invention.

Then, as shown in FIG. 37, an end section of the right half portion 1R in the secondary folded body is folded leftward along a seventh vertical folding line 56 that coincides with the first folding line 50. In the present embodiment, the end section of the right half portion 1R is folded to be placed under a section of the right half portion 1R between the seventh vertical folding line 56 and the second folding line 51.

Accordingly, a band-shaped folded body 1B''' that extends vertically is obtained.

Next, the band-shaped folded body is folded to reduce the vertical size thereof by either the process shown in FIGS. 6 to 13, the process shown in FIG. 17, 18, or 19. Accordingly, the folded airbag 1 is obtained.

Then, a retaining ring 2 is inserted into the folded airbag, and stud bolts 3 that project from the retaining ring 2 are inserted through bolt holes formed in the airbag. Then, the folded airbag 1 is covered with a protector cloth 4. Then, a retainer and an inflator are attached to the assembly of the folded airbag, the retaining ring 2, and the protector cloth 4, and a module cover is attached to the retainer so as to cover the assembly. Accordingly, an airbag device is completed.

Also in this embodiment, when the front end of an automobile in which this airbag device is mounted collides, the inflator is activated and the airbag 1 is inflated with gas supplied from the inflator. At this time, the right half portion 1R of the airbag 1, which is on the right side as viewed from the occupant, inflates faster than the left half portion 1L. Therefore, a component of inflation velocity of the inflating airbag 1 in a direction toward the occupant is smaller than that in the case in which the airbag 1 evenly inflates in the horizontal direction. As a result, the occupant which moves toward the inflating airbag 1 is relatively softly received by the airbag 1.

In this embodiment, the end section of the right half portion 1R in the secondary folded body is folded to be placed under the section of the right half portion 1R between the seventh vertical folding line 56 and the second folding line 51. However, the end section of the right half portion 1R may also be folded onto the secondary folded body.

In addition, in the present embodiment, the right half portion 1R in the secondary folded body is folded leftward only once along the seventh vertical folding lines 56. However, the right half portion 1R may also be folded in a roll style. Alternatively, the right half portion 1R may be alternately folded leftward and rightward a plurality of times in a zigzag style.

The airbag 1 may also be folded in a manner reversed from that shown in FIGS. 31 to 37 in the horizontal direction. In such a case, when the airbag 1 inflates, the left half portion 1L of the airbag 1, which is on the left side as viewed from the occupant, inflates faster than the right half portion 1R.

In the present invention, each of the left half portion 1L and the right half portion 1R in the secondary folded body of the airbag 1 may also be folded in a combination of a zigzag style and a roll style.

The embodiments shown in the figures are merely examples of the present invention and various embodiments other than those shown in the figures are possible within the scope of the present invention. For example, although the airbag 1 is oval in the above-described embodiments, the airbag 1 may also have a relatively rectangular shape such that upper and lower ends at the left and right sides protrude. In addition, although a protector cloth 4 is used in the above-described embodiments, the protector cloth 4 may also be omitted.

The present invention has several advantages. For example, in the folded airbag 1 according to the present invention and the airbag device including the folded airbag, when the airbag 1 is inflated with gas supplied from an inflator, one of the left portion and the right portion inflates faster than the other. Therefore, a component of inflation velocity of the inflating airbag 1 in a direction toward the occupant is relatively small, and the occupant is relatively softly received by the inflating airbag.

When the upper and lower portions of the band-shaped folded body are folded a plurality of times along the horizontal folding lines 21-29 and when the number of times the lower portion is folded is greater than the number of times the upper portion is folded, the upper portion of the airbag 1 inflates faster than the lower portion. Therefore, the surface of the inflating airbag 1 that faces the occupant is oriented substantially vertically. As a result, the occupant's upper body (for example, the head and chest) is relatively evenly received by the airbag 1 over a large area.

The priority applications Japanese Patent Application 2004-264200, filed Sep. 10, 2004, and Japanese Patent Application 2005-244537, filed Aug. 25, 2005 including the specification, drawings, claims and abstract, are incorporated herein by reference in their entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An airbag, folded and mounted in a steering wheel, wherein:

the airbag is folded along a plurality of vertical folding lines and horizontal folding lines that extend in a vertical direction and a horizontal direction, respectively, of the steering wheel in an inflated state, and wherein the airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines, and wherein the band-shaped folded body is obtained by:

folding a first half portion of the unfolded airbag in the horizontal direction onto a second half portion -along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion in the secondary folded body along a third vertical folding line that substantially coincides with the first vertical folding line to obtain a tertiary folded body; and folding the second half portion in the tertiary folded body along a fourth vertical folding line that substantially coincides with the second vertical folding line and folding the first half portion in the tertiary folded body along a fifth vertical folding line that substantially coincides with the first vertical folding line.

2. The airbag as recited in claim 1, wherein the upper portion and the lower portion of the band-shaped folded body are folded a plurality of times along the horizontal folding lines, the number of times the lower portion is folded being greater than the number of times the upper portion is folded.

3. An airbag, folded and mounted in a steering wheel, wherein:

the airbag is folded along a plurality of vertical folding lines and horizontal folding lines that extend in a vertical direction and a horizontal direction, respectively, of a steering wheel in an inflated state, and wherein the airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines, and wherein the band-shaped folded body is obtained by:

folding a first half portion of the unfolded airbag in the horizontal direction onto a second half portion along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion along a third folding line to obtain a tertiary folded body, wherein the third folding line is positioned at a centerline of the airbag; and folding the first and second half portions in the secondary folded body so as to reduce the width in the horizontal direction.

4. The airbag as recited in claim 3, wherein the first and second half portions in the secondary folded body are folded in a zigzag style so as to reduce the width in the horizontal direction.

5. The airbag as recited in claim 3, wherein the first and second half portions in the secondary folded body are folded in a roll style so as to reduce the width in the horizontal direction.

6. The airbag as recited in claim 3, wherein the first and second half portions in the secondary folded body are folded in combination of a zigzag style and a roll style so as to reduce the width in the horizontal direction.

7. The airbag as recited in claim 3, wherein the upper portion and the lower portion of the band-shaped folded body are folded a plurality of times along the horizontal folding lines, the number of times the lower portion is folded being greater than the number of times the upper portion is folded.

8. An airbag device, comprising:
an airbag, folded and mounted in a steering wheel, wherein the airbag is folded along a plurality of vertical folding lines and horizontal folding lines that extend in a vertical direction and a horizontal direction, respectively, of the steering wheel in an inflated state, and wherein the airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines, and wherein the band-shaped folded body is obtained by:
folding a first half portion of the unfolded airbag in the horizontal direction onto a second half portion along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion in the secondary folded body along a third vertical folding line that substantially coincides with the first vertical folding line to obtain a tertiary folded body; and folding the second half portion in the tertiary folded body along a fourth vertical folding line that substantially coincides with the second vertical folding line and folding the first half portion in the tertiary folded body along a fifth vertical folding line that substantially coincides with the first vertical folding line.

9. The airbag device as recited in claim 8, wherein the upper portion and the lower portion of the band-shaped folded body are folded a plurality of times along the horizontal folding lines, the number of times the lower portion is folded being greater than the number of times the upper portion is folded.

10. An airbag device, comprising:
an airbag, folded and mounted in a steering wheel, wherein the airbag is folded along a plurality of vertical folding lines and horizontal folding lines that extend in a vertical direction and a horizontal direction, respectively, of a steering wheel in an inflated state, and wherein the airbag is substantially circular in an unfolded state, and a final folded shape of the airbag is obtained by folding the circular airbag a plurality of times along the vertical folding lines into a band-shaped folded body that extends vertically, and then folding an upper portion and a lower portion of the band-shaped folded body along the horizontal folding lines, and wherein the band-shaped folded body is obtained by:
folding a first half portion of the unfolded airbag in the horizontal direction onto a second half portion along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion along a third folding line to obtain a tertiary folded body, wherein the third folding line is positioned at a centerline of the airbag and folding the first and second half portions in the secondary folded body so as to reduce the width in the horizontal direction.

11. The airbag device as recited in claim 10, wherein the first and second half portions in the secondary folded body are folded in a zigzag style so as to reduce the width in the horizontal direction.

12. The airbag device as recited in claim 10, wherein the first and second half portions in the secondary folded body are folded in a roll style so as to reduce the width in the horizontal direction.

13. The airbag device as recited in claim 10, wherein the first and second half portions in the secondary folded body are folded in combination of a zigzag style and a roll style so as to reduce the width in the horizontal direction.

14. The airbag device as recited in claim 10, wherein the upper portion and the lower portion of the band-shaped folded body are folded a plurality of times along the horizontal folding lines, the number of times the lower portion is folded being greater than the number of times the upper portion is folded.

15. A method for folding an airbag, comprising the steps of:
providing an airbag, having a plurality of horizontal folding lines and vertical folding lines, in an unfolded state;

folding a first half portion of the unfolded airbag in the horizontal direction onto a second half portion along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion in the secondary folded body along a third vertical folding line that substantially coincides with the first vertical folding line to obtain a tertiary folded body;

folding the second half portion in the tertiary folded body along a fourth vertical folding line that substantially coincides with the second vertical folding line and folding the first half portion in the tertiary folded body along a fifth vertical folding line that substantially coincides with the first vertical folding line to obtain a band-shaped body; and folding an upper portion and a lower portion of the band-shaped folded body along the horizontal folding lines.

16. A method for folding an airbag, comprising the steps of:

providing an airbag, having a plurality of horizontal folding lines and vertical folding lines, in an unfolded state;

folding a first half portion of the unfolded airbag in the horizontal direction onto a second half portion along a first vertical folding line positioned in the first half portion so as to obtain a primary folded body;

folding the first half portion and the second half portion in the primary folded body along a second vertical folding line positioned in the second half portion so as to obtain a secondary folded body;

folding the second half portion along a third folding line to obtain a tertiary folded body, wherein the third folding line is positioned at a centerline of the airbag;

folding the first and second half portions in the secondary folded body so as to reduce the width in the horizontal direction to obtain a band-shaped body; and folding an upper portion and a lower portion of the band-shaped folded body along the horizontal folding lines.

17. A driver side airbag module to be mounted in a steering wheel having a vertical and horizontal direction, comprising an airbag substantially circular in an unfolded state; wherein the airbag is folded a plurality of times along vertical folding lines into a band-shaped folded body that extends vertically, and then upper and lower portions of the band-shaped folded body are folded along horizontal folding lines, and wherein the band-shaped folded body is obtained by:

folding a first half portion of the unfolded airbag onto a second half portion along a first vertical folding line positioned in the first half portion to thereby form a primary folded body;

folding the first half portion and the second half portion in the primary folded body along a second vertical folding line positioned in the second half portion to thereby form a secondary folded body;

folding the second half portion in the secondary folded body along a third vertical folding line that substantially coincides with the first vertical folding line to thereby form a tertiary folded body; and folding the second half portion in the tertiary folded body along a fourth vertical folding line that substantially coincides with the second vertical folding line and folding the first half portion in the tertiary folded body along a fifth vertical folding line that substantially coincides with the first vertical folding line.

* * * * *